(12) United States Patent
Chen

(10) Patent No.: US 6,556,704 B1
(45) Date of Patent: Apr. 29, 2003

(54) METHOD FOR FORMING A DEPTH IMAGE FROM DIGITAL IMAGE DATA

(75) Inventor: Shoupu Chen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/382,451

(22) Filed: Aug. 25, 1999

(51) Int. Cl.[7] ................................................. G06K 9/00
(52) U.S. Cl. ...................................... 382/154; 382/274
(58) Field of Search ................................ 382/154, 106, 382/108, 164, 190, 201, 213, 218, 254, 285, 173, 274; 348/586, 103, 530, 105, 209, 459, 588, 587, 510, 211, 591, 592; 345/634, 683

(56) References Cited

U.S. PATENT DOCUMENTS

| | | | | |
|---|---|---|---|---|
| 3,778,542 A | | 12/1973 | Hanseman ................... | 178/5.4 |
| 4,573,191 A | * | 2/1986 | Kidode et al. .............. | 382/106 |
| 4,629,298 A | | 12/1986 | Trumbull et al. ............. | 353/30 |
| 4,858,157 A | * | 8/1989 | Murai et al. ................... | 348/42 |
| 5,202,928 A | * | 4/1993 | Tomita et al. ............... | 395/121 |
| 5,251,016 A | | 10/1993 | Delwiche ..................... | 358/22 |
| 5,383,013 A | * | 1/1995 | Cox ............................... | 356/2 |
| 5,812,214 A | | 9/1998 | Miller .......................... | 348/587 |
| 5,825,915 A | * | 10/1998 | Michimoto et al. ......... | 382/281 |
| 5,917,937 A | * | 6/1999 | Szeliski et al. ............. | 382/154 |
| 5,930,383 A | * | 7/1999 | Netzer ......................... | 382/154 |
| 6,205,260 B1 | * | 3/2001 | Crinon et al. ............... | 345/634 |

OTHER PUBLICATIONS

"A parallel stereo algorithm that produces dense depth maps and preserves image features" by Pascal Fuo. Machine Vision and Applications (1993) 6, pp. 35–49.

"Stereo by Intra– and Inter–Scanline Search Using Dynamic Programming" by Yuichi Ohta and Takeo Kanade. IEEE Transactions on Pattern Analysis and Machine Intelligence, vol. PAMI–7, No. 2, Mar. 1985.

"Segmenting focused objects in complex visual images" by Du–Ming Tsai and Hu–Jong Wang, *Pattern Recognition Letters*, 19, pp. 929–940, 1998.

"Edge Segment Based Stereo Analysis" by Suresh b. Marapane and Mohan M. Trivedi. *SPIE* vol. 1293, *Applications of Artificial Intelligence VIII*, pp. 140–151, 1990.

"Region–Based Stereo Analysis for Robotic Applications" by Suresh B. Marapane and Mohan M. Trivedi. *IEEE Trans. Systems, Man, and Cybernetics*, 19(6): 1447–1464, 1989.

Eastman Kodak Docket 79239DMW, Nathan D. Cahill et al., Aug. 25, 1999.

* cited by examiner

*Primary Examiner*—Bhavesh Mehta
*Assistant Examiner*—Sheela Chawan
(74) *Attorney, Agent, or Firm*—David M. Woods

(57) ABSTRACT

A computer vision/image processing method generates a depth map useful in producing a foreground depth mask for 2D/3D image editing. The method uses image data from a plurality of scenes. Feature points on each of the vertical scan lines in each of the scene images are used to search for corresponding feature points on the corresponding vertical lines in other images. The corresponding feature-point search is performed by using a bipartite match network with a feature-point-ordering constraint and a disparity-limit constraint, and produces an individual feature-point depth map for each input image. A sparse feature-point depth map of the scene is obtained after applying a consistency test to all the individual depth maps. A complete feature-point depth map is produced by applying a color property assisted depth propagation process to the sparse feature-point depth map. Foreground and background separation is then conducted in the depth domain by using the order statistics of the depth data extracted the feature-point depth map. A foreground feature-point depth map is obtained from the separation operation. The final foreground depth mask is generated by applying a color aided eight-nearest-neighbor LMS interpolation process to the foreground feature-point depth map.

40 Claims, 13 Drawing Sheets

METHOD FOR FORMING A DEPTH IMAGE FROM DIGITAL IMAGE DATA

CROSS-REFERENCE TO RELATED APPLICATION(S)

Reference is made to commonly assigned copending applications Ser. No. 09/162,310, entitled "Method and Apparatus for Capturing Panoramic Images with Range Data", filed Sep. 28, 1998 in the names of Lawrence A. Ray, Carl N. Schauffele and Brett VanSprewenburg, and Ser. No. 09/383,573 entitled "Method for Creating an Environment Map Containing Information Extracted from Stereo Image Pairs", filed on even date herewith in the names of Nathan P. Cahill and Shoupu Chen, each of which are assigned to the assignee of this application.

FIELD OF THE INVENTION

The invention relates to processing of image data and, more particularly to a method for the processing of a plurality of images associated with a scene imaging system that is capable of producing depth information of the scene. Still more specifically, the invention pertains to a method of distinguishing foreground and background of the scene in a depth space for extracting the foreground that is to be inserted into other images.

BACKGROUND OF THE INVENTION

Foreground extraction or background suppression has been a topic in the composite photography and cinematography industry for many years. For instance, in U.S. Pat. No. 3,778,542 (issued Dec. 11, 1973 to L. C. Hanseman and entitled "Blue screen travelling matte system"), a blue screen travelling matte system is used to create special photographic effects. In this design, a particular selectable saturated color appearing in the simultaneous red, blue and green video output signals of an electronic color camera is sensed and removed from the video signals by electronic subtraction of the selected color. The output red, blue and green video signals derived from a second electronic color camera are substituted for the removed saturated color. The final composite red, blue and green video output signals therefore contain picture elements from both cameras, combined in a manner such that the specific saturated color from the first camera is completely eliminated and replaced by picture elements derived from the second camera. One of the limitations of this system is that a uniformly colored (blue, green, or any constant backing color) background is required in order to extract the region of interest (human figure, for instance, in a newscast). This requirement in turn demands a constrained, structured environment that would limit the usage of this technology to very controlled situations. Many variations of blue screen method have been developed over the years (see, e.g., U.S. Pat. Nos. 5,812,214; 5,251,016; 4,629,298) but they all have the same limitations mentioned hereinabove.

It is understood that the purpose of imposing the aforementioned background restrictions is to compensate for the lack of enough information in the background suppression process. If these restrictions are to be removed, other information must be included so that the problem is still solvable. For example, in Tsai et al. ("Segmenting focused objects in complex visual images," *Pattern Recognition Letters,* 19, pp. 929–940, 1998) the measurement of defocus of object edges in an image is used to separate complex foreground and background objects. Thus Tsai et al introduces the notion of spatial separation by looking at the degree of defocusing of the image objects. It is known that a two-dimensional planar intensity image is a perspective projection of a three-dimensional scene. It appears that the degrees of freedom of dimension are reduced from 3 to 2, but the spatial information in the third dimension seems lost in the course of projection. This lost spatial information is physically the distance (depth) from the scene to the sensing device, that is, the camera. In fact, the depth information is embedded in the original image pixel locations in that their locations are tightly related to the depth of the corresponding 3D scene. This spatial information, which is lost in the 2D projection, can be recovered by searching corresponding points (pixel locations) in a plurality of displaced intensity images of the scene.

FIG. 1 illustrates an exemplary background suppression system equipped with a pair of cameras $11a$ and $11b$ that capture two color images: top image $13b$ and bottom image $13a$. Notice that the contents in the two images, e.g., the respective person images $14a$ and $14b$ and computer images $15a$ and $15b$, have a vertical dislocation if the edges of the image frames are aligned. This dislocation is called global disparity, and it is a function of the average distance of the scene from the camera. The system needs to find individual disparity corresponding to each visible surface point in the scene so that a depth image can be produced. The value of each pixel in the depth image will represent the distance from the corresponding scene point being projected to that pixel location. In foreground extraction situations, the depth image is usually displayed as a gray scale image 10 as shown in FIG. 1 although it could also be displayed as a color image if the gray scale is color-coded. The depth image 10 in FIG. 1 reveals that a person 17 is in the foreground with a higher gray scale and a computer 16 is in the background with a lower gray scale. Intuitively, the foreground can be separated from the background based on such depth values. The separation of foreground and background can lead to the formation of a foreground mask image 18 showing a depth mask 19. The mask 19 is then used to select the corresponding person region 21 of the bottom intensity image $13a$, and thereby produce a foreground image. The same mask is also used in compositing images as shown in FIG. 2 where the person 21 is added to the scene of a door 31. In this case, the foreground mask image 18, with the person depth mask 33, is used to suppress a portion of the background in the door image 31, thereby generating an intermediate image 34 in which a portion 35 of the door 36 is blocked out so that a person region 21 may be substituted in its place in the resultant composite image 41. Notice that the suppressed background is not a constant backing color scene.

From another perspective, separating foreground and background is essentially an image segmentation task that is formidable without a model, especially where there is a complex background. For example, FIG. 3 presents a scene with a person 63 in the foreground and a face picture 62 in the background. Usually, a face model would be used to single out the person in the image. If so, the face picture in the background will still be classified as part of the foreground and be selected as well. However, with the help of depth information, background suppression for this kind of scene would be possible. Accordingly, using the depth information of a scene is an effective way to extract foreground or suppress background of the scene image. The key issues, however, are the acquisition and processing of the depth information. Conventional depth recovery algorithms (see S B Marianne and M. M. Trigged, "Region-based stereo analysis for robotic applications," *IEEE Trans. Systems, Man, and Cybernetics,* 19(6): 1447–1464, 1989, and S. B.

Marapane and M. M. Trivedi, "Edge segment based stereo analysis," *SPIE Vol. 1293, Applications of Artificial Intelligence VIII*, pp. 140–151, 1990) do not provide clear depth boundaries (depth discontinuities) that are needed in forming a clear foreground depth mask.

What is therefore needed is a way to provide clear depth boundaries so that an accurate depth image, or map, can be formed. One use is to provide an image composite system wherein a foreground depth mask is formed by the means of analyzing the depth map of a scene. While this depth image, or map, would be used in the preferred embodiment in connection with an image composite system, it should be clearly recognized that such a depth image would be useful in a variety of situations, such as in the formation of virtual images. Consequently, the basic object is to provide a scene depth imaging system in which a scene depth map produced from a plurality of images provides more accurate depth data.

SUMMARY OF THE INVENTION

It is an object of the present invention to provide a scene depth imaging system in which a scene depth map produced by a plurality of images provides more accurate depth data.

It is a further object of the present invention to provide an image composite system wherein a foreground depth mask is formed by the means of analyzing the depth map of a scene.

The present invention is directed to overcoming one or more of the problems set forth above. Briefly summarized, according to one aspect of the present invention, a method and a computer program product for forming a depth image of a scene comprises the steps of: (a) generating intensity parameters corresponding to image features in each of two intensity images of a scene, the intensity parameters in one image pairing with intensity parameters in the other image to form pairs of intensity parameters indicative of potential correspondence between features in the two intensity images; (b) eliminating one or more pairs of intensity parameters based on one or more constraints related to the feasibility of a valid match between the pairs of intensity parameters; (c) calculating a match score for each of the remaining pairs of intensity parameters; (d) processing the match scores of the remaining pairs of intensity parameters through a processing algorithm in order to find matched pairs of intensity parameters indicative of correspondence between the same features in the two intensity images; and (e) generating a depth image from the matched pairs of intensity parameters.

In accordance with another aspect of the invention, a feature-point (edge point) guided matching method is used to find corresponding pixels in at least two different images presenting a scene so that an initial feature-point depth map of the scene can be computed. To reduce the mismatch rate, a consistency testing procedure is employed after each of the images has produced an initial feature-point depth map of the scene. A less noisy, but sparse, feature-point depth map is generated after the consistency testing procedure.

In another aspect, the present invention provides a color property assisted depth propagation method to establish a complete feature-point depth map after the sparse feature-point depth map is obtained. This includes setting up a size adjustable window at each feature point that does not have a depth value; searching within the window for qualified feature points that have depth values and pass a color property checking; and computing depth for the feature point that does not have a depth value using the depth values of the qualified feature points.

According to another aspect of the invention, there is provided a method of separating the foreground and the background of the scene and suppressing the background based on the depth map of the scene. The method includes sorting the depth values in the depth map in a descending or ascending order; eliminating depth values at some feature points based on an order statistics obtained from the ordered depth values; computing a histogram of the number of the feature points that still have depth values in a column-wise fashion, therefore to further deprive the depth values at feature points that do not belong to the majority of the remaining feature points that have depth values.

According to another aspect of the invention, a foreground depth mask is generated using the depth map containing the foreground feature points. For every pixel that does not have a depth value within the foreground region that is determined by the foreground feature points, a length extendable eight-nearest-neighbor search is conducted to collect a sufficient amount of feature points that have depth values and also satisfy a color criterion. An LMS (least median squared) estimation is then performed using the collected feature points to compute a depth value for that pixel.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT

The current invention presents a method of forming a foreground depth mask, which in turn provides an alternative approach to the foreground extraction problem in the blue screen technology so that the need of a specially arranged environment with a constant backing color can be eliminated. This invention utilizes a plurality of images associated with a scene imaging system to produce a depth map of the scene for which the foreground is to be separated from the background. This invention enables the use of an arbitrary background rather than a uniformly colored one to extract the foreground object of interest. Moreover, the image composite operation after the extraction can be conducted in either 2D space or 3D space.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. Given the description as set forth in the following specification, all software implementation thereof is conventional and within the ordinary skill in such arts. In the following, the phrase "depth map" will sometimes be used interchangeably with "depth image", unless the context indicates otherwise.

Still further, as used herein, the software program may be stored in a computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 12:
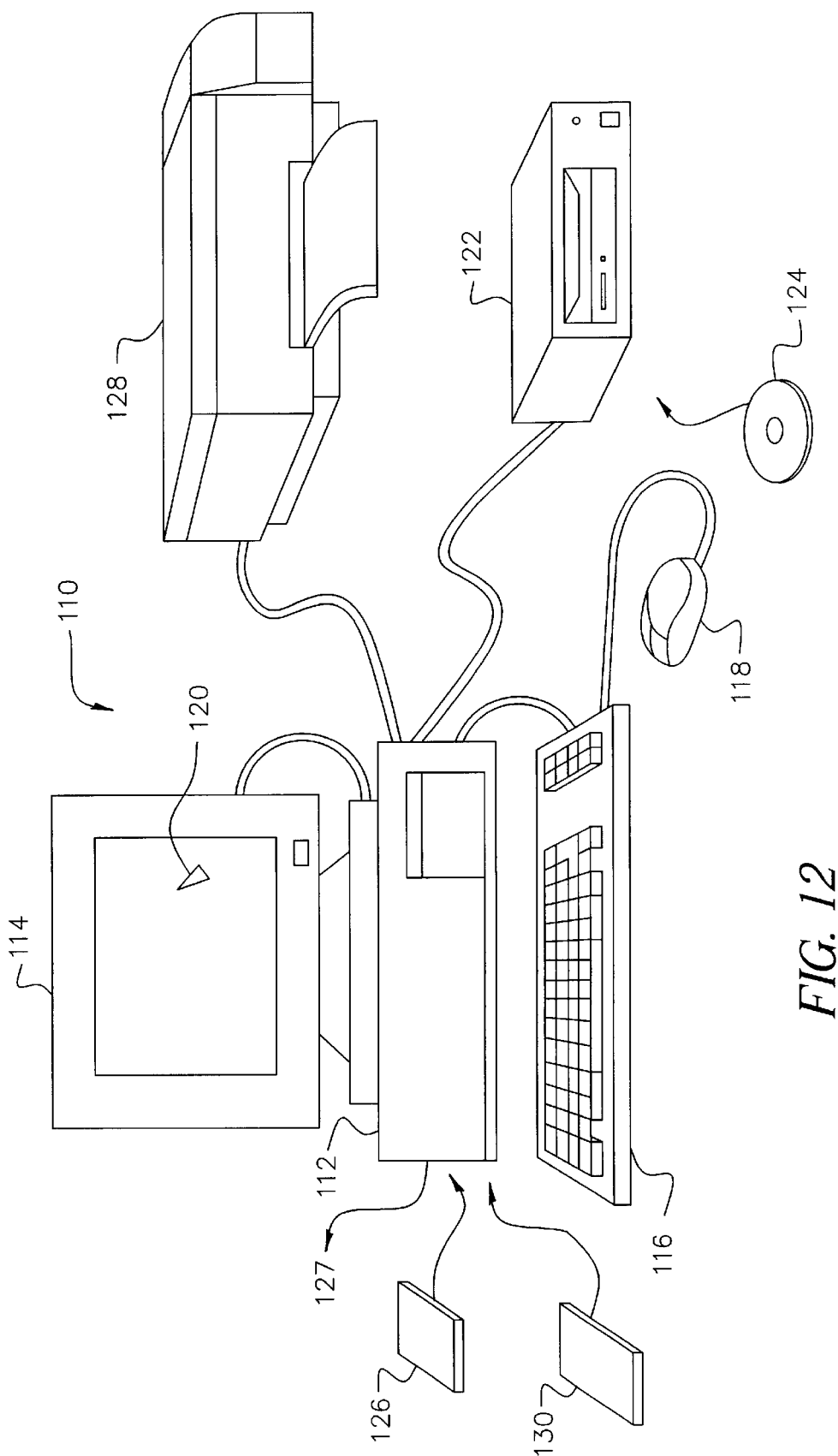
FIG. 12 is a perspective diagram of a computer system for implementing the present invention.

Referring to FIG. 12, there is illustrated a computer system 110 for implementing the present invention. Although the computer system 110 is shown for the purpose of illustrating a preferred embodiment, the present invention is not limited to the computer system 110 shown, but may be used on any electronic processing system. The computer system 110 includes a microprocessor-based unit 112 for receiving and processing software programs and for performing other processing functions. A display 114 is electrically connected to the microprocessor-based unit 112 for displaying user-related information associated with the software. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of an image on the display 114. Images may also be input via the compact disk 124, the floppy disk 126, or the network connection 127. Any images stored in the PC card 130, the floppy disk 126 or the computer disk 134, or input through the network connection 127, may have been obtained from a variety of sources, such as a digital camera (not shown) or a scanner (not shown). In accordance with the invention, the images are obtained and processed in accordance with the following techniques and methods.

1. System Design

Figure 1:
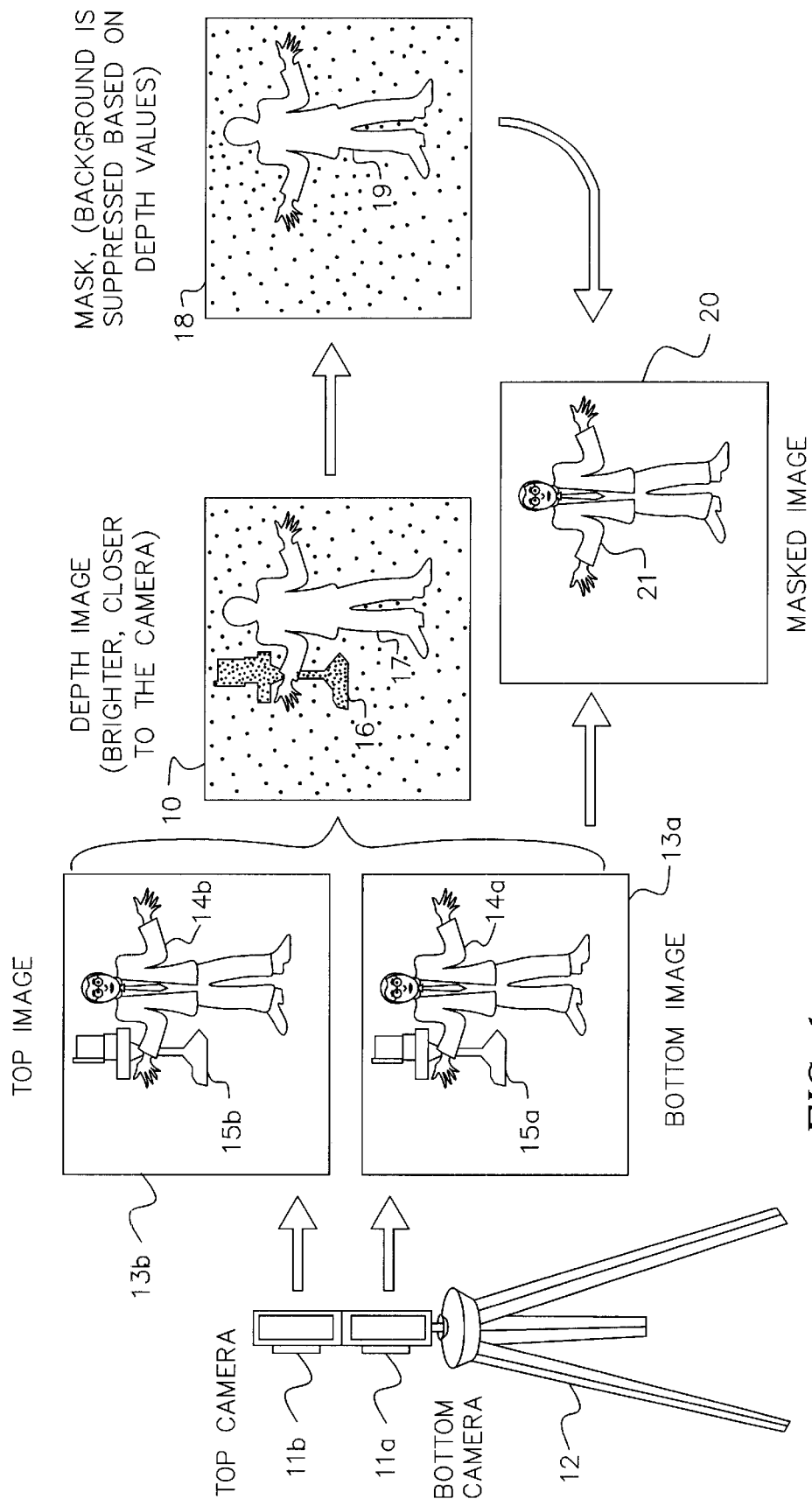
FIG. 1 is a schematic flow chart illustrating the successive stages of a foreground depth mask formation process in which a foreground depth mask (and the masked foreground intensity image) is produced by using a pair of intensity images captured by a pair of vertically displaced cameras.
Figure 2:
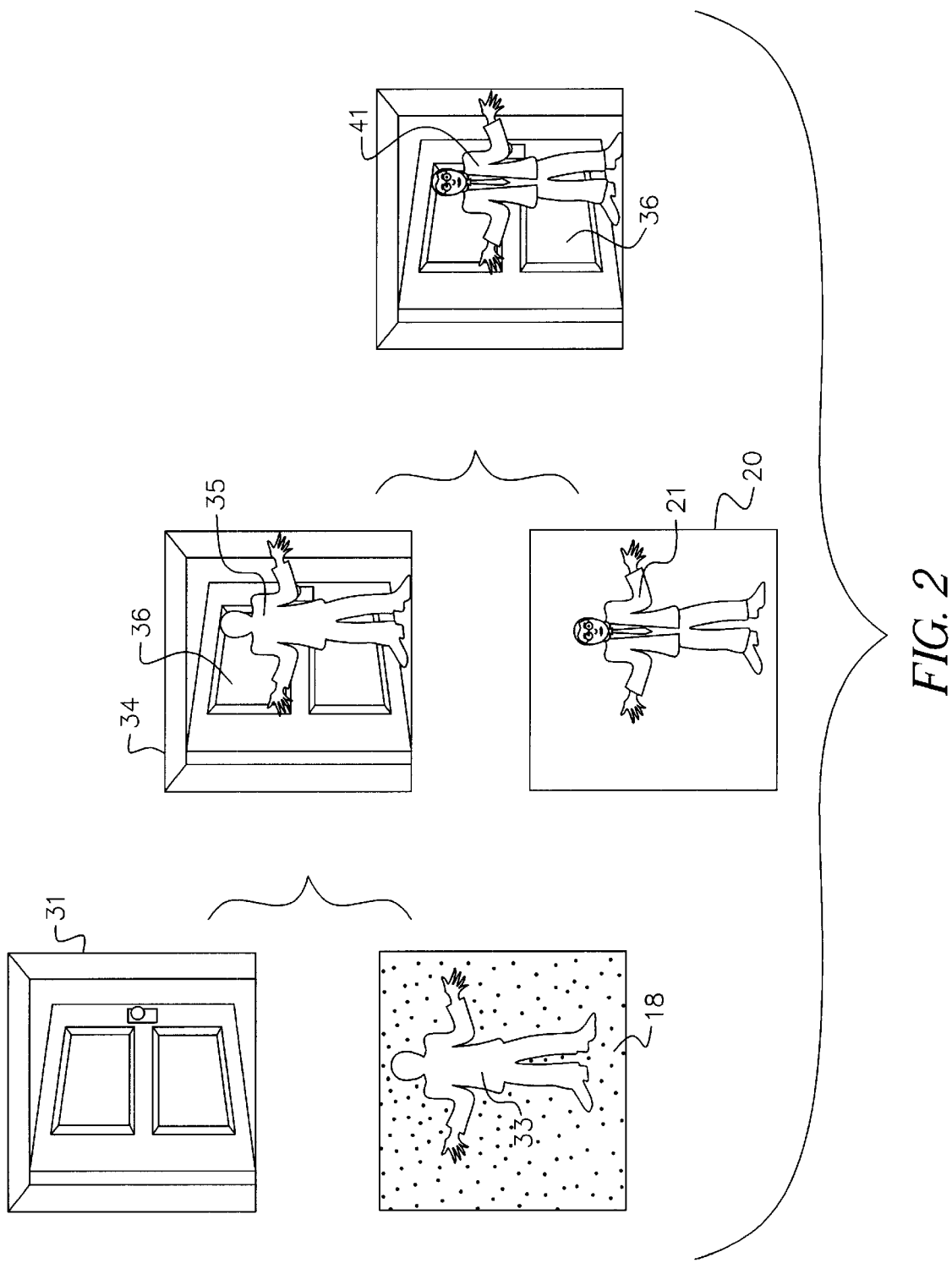
FIG. 2 is a schematic flow chart illustrating the successive stages of an image composite process in which a composite image is produced by using a background image and the foreground depth mask (and the masked foreground intensity image) generated in the process illustrated in FIG. 1.
Figure 3:
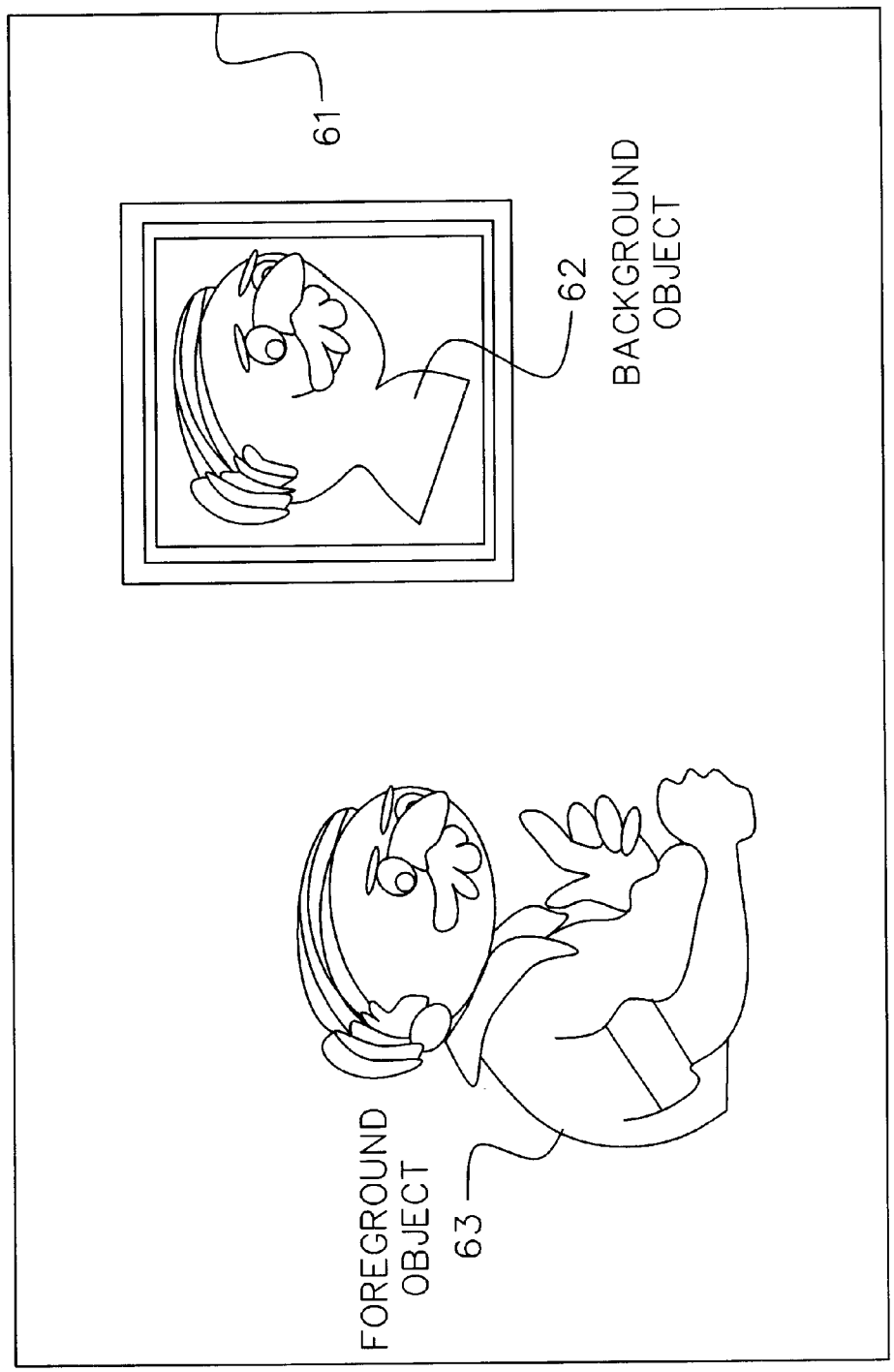
FIG. 3 is a pictorial view of a foreground object and a background object that has almost the same characteristics as the foreground.
Figure 4:
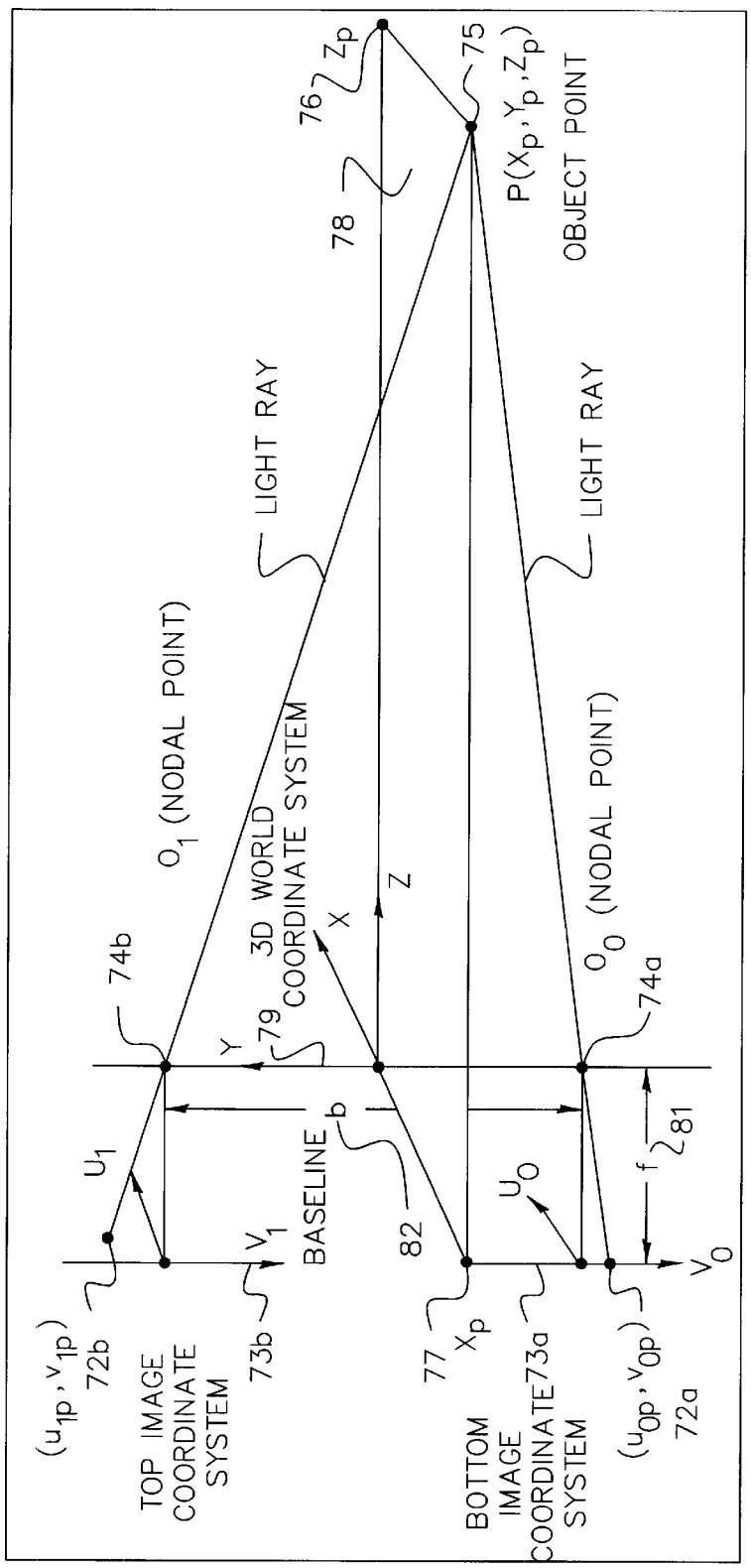
FIG. 4 is a representation of the optical geometry associated with two images of a scene.

With reference to FIG. 1, two vertically mounted cameras 11a and 11b, which are described in more detail in the aforementioned Ser. No. 09/162,310, and which is incorporated herein by reference, are arranged to capture two vertically displaced versions of the same scene, the bottom image 13a and the top image 13b. FIG. 4 shows the relationship between the camera 2D image coordinate system (73a and 73b), for the two images 13a and 13b, and a 3D world coordinate system 79. More specifically, the origin of the three-dimensional world coordinate system 79 is defined at the center of the line between a bottom camera nodal point 74a and a top camera nodal point 74b. The perspective projection of a 3D point 75 (also shown as point p and represented by $(x_p, y_p, z_p)$, which, without loss of generality, is in an XZ plane 78), is denoted by points $(u_{0p}, v_{0p})$ 72a and $(u_{1p}, v_{1p})$ 72b for the bottom image and the top image, respectively. The disparities associated with the point p are defined as $$d_{u_p} = u_{0p} - u_{1p} \qquad \text{Eq. (1)}$$

and $$d_{v_p} = v_{0p} - v_{1p} \qquad \text{Eq. (2)}$$

In practice, the cameras are arranged in such a way that the value of one of the disparities is always considered to be zero. In the present invention $d_{u_p} = 0$. The depth information 76, i.e., coordinate $z_p$ of point p (75), can be readily computed using the found disparity $d_{v_p}$: $z_p=fb/d_{v_p}$, where b is a baseline 82 and f is a focal length 81. The cameras 11a, 11b are assumed to be identical and share in the same optical specifications, e.g., focal length 81 and field of view. The baseline 82 (i.e., the distance between the top and bottom images) of the two cameras 11a, 11b directly influences the resolution of depth estimates for each point in the captured image. The length of the baseline 82 is a function of the expected distance from the camera to the objects of interest; i.e., a longer baseline is more useful than a short baseline for distant subjects. To permit this adjustment, as described in the aforementioned Ser. No. 09/162,310, the camera system has an adjustable vertical baseline mechanism, such as an adjustable rack and pinion on a camera support. The amount of vertical baseline 82 is displayed on a vernier gauge on the support. The baseline distance 82 may be read from the vernier gauge and then employed, together with the focal length and the found disparity, in accurately determining the distance $z_p$ from the cameras 11a, 11b to the point 75.

Figure 5:
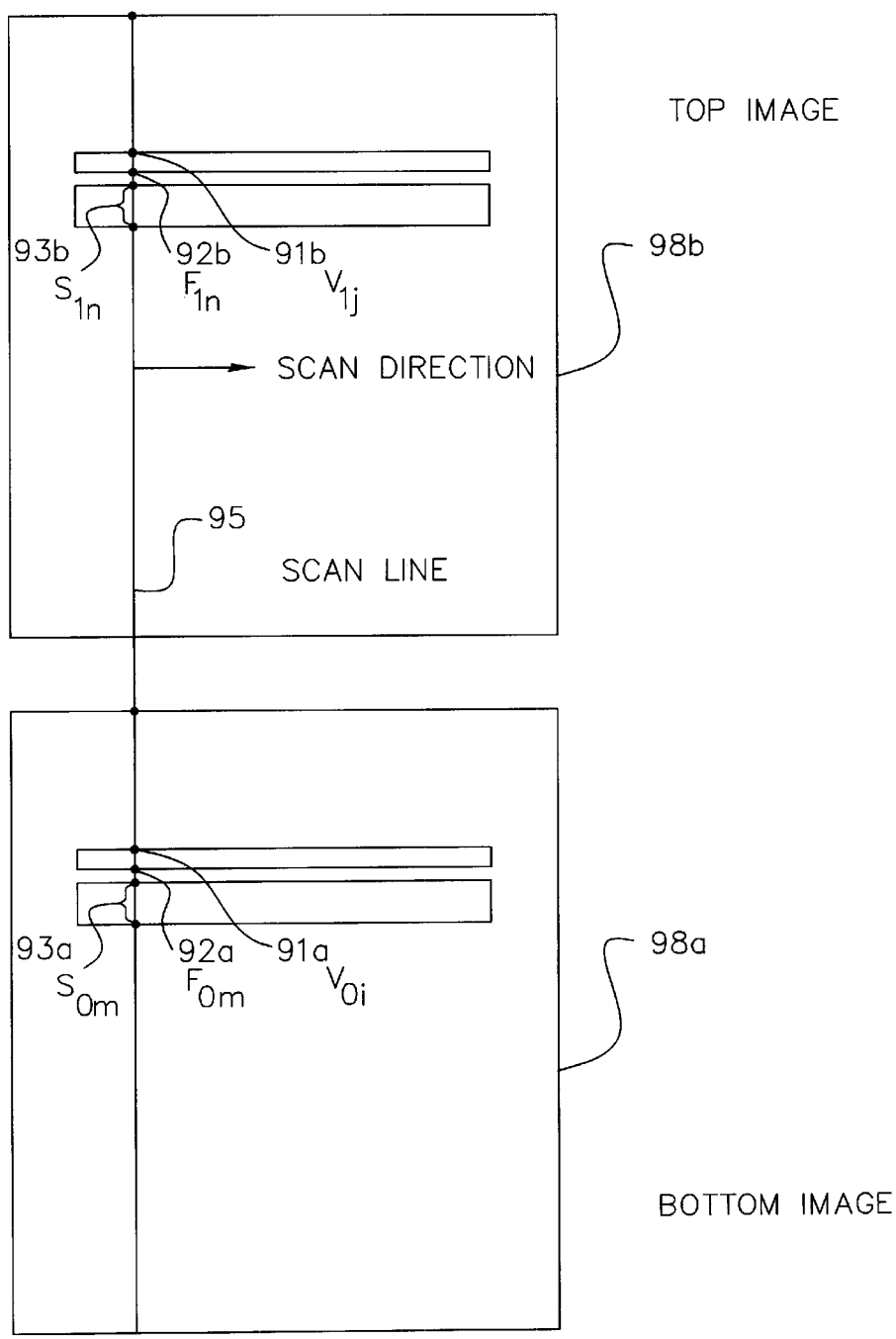
FIG. 5 is a pictorial view of a pair of images in a process of searching corresponding points on a particular vertical scan line.
Figure 6:
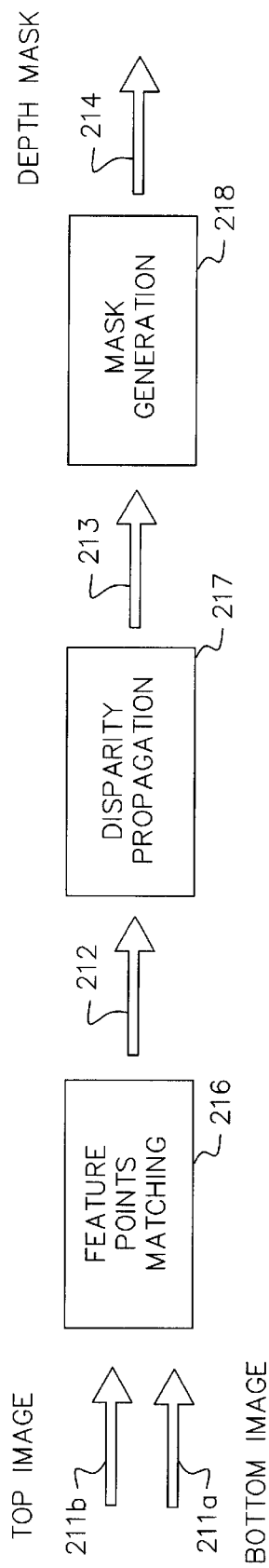
FIG. 6 is the flow chart for the major algorithmic steps which are performed to effect formation of a foreground depth mask in accordance with the method of the present invention.

In FIG. 4, the two cameras are aligned vertically. Therefore, $u_{0p}=u_{1p}$. To estimate the depth of a 3D point in the scene, the search for corresponding points in two images is conducted along a vertical scan line 95 as illustrated in FIG. 5. The search dimensions are thus reduced from 2 to 1. An algorithm with this arrangement for generating a depth map of the scene to suppress the background is outlined in FIG. 6. It comprises several key stages including feature points matching 216, disparity propagation in feature space 217, and foreground depth mask formation 218.

2. Feature Points Matching

The search of corresponding points (matching points) is not conducted at every pixel of the image, but rather at the pixels that are feature points (edge points) of the intensity image, for instance, at the locations of vertical indices 91a and 91b ($v_{0i}$ and $v_{1j}$) in FIG. 5. These feature points can be obtained in a conventional manner in a variety of ways, for example, by applying a gradient operator to each column (vertical scan-line) of the two images. Denote a feature point map by $\Phi_k$; k=0,1; with the same dimension, M×N, as the intensity image, k=0 for the bottom image, and k=1 for the top image. The feature point map can be expressed as $$\Phi_k = [\phi_0^k, \ldots, \phi_n^k, \ldots, \phi_{N-1}^k] \quad \text{Eq. (3)}$$

where $$\phi_n^k = [\phi_{0n}^k, \ldots, \phi_{mn}^k, \ldots, \phi_{(M-1)n}^k]^T \quad \text{Eq. (4)}$$

and $$\phi_{mn}^k = \begin{cases} 1 & \text{if there is a feature point at location } (m, n) \\ 0 & \text{otherwise} \end{cases} \quad \text{Eq. (5)}$$

Denote the feature point itself by $F_{kw}$, where k=0,1, and w=0,1,2, ..., $N_k$. $N_k$ is the number of feature points. With reference to FIG. 5, the example feature points 92a and 92b are shown as $F_{0m}$ and $F_{1n}$, respectively. The index for a specific column is omitted, since the search of matching points is conducted one column at a time. The value of a feature point $F_{kw}$ is the vertical coordinate where the feature point resides. For instance:

$$F_{00}=m; \text{ if } \phi_{mn}^0=1 \text{ and if this is the first feature point} \quad \text{Eq. (6)}$$

The origin of the image coordinate system is at the center of the image as shown in FIG. 4. The feature points are indexed from the top of the image towards the bottom, so there is an ordering property associated with the feature points:

$$F_{ki}<F_{k(i+1)} \quad \text{Eq. (7)}$$

Denote an intensity parameter, hereinafter referred to as an intensity segment, starting from a feature point $F_{ki}$ to the subsequent feature point $F_{k(i+1)}$ by $$S_{ki}=I_k[F_{ki}, F_{ki}+1, \ldots, F_{k(i+1)}-1, F_{k(i+1)}] \quad \text{Eq. (8)}$$

where k=0,1; and $I_k[\ldots]$ signifies a sequence of intensity values at the locations indicated by the attributes inside the brackets. With reference to FIG. 4, examples of intensity segments 93a and 93b are shown as $S_{0m}$ and $S_{1n}$, respectively. The general match procedure is explained below.

Suppose the match process takes the bottom image 98a (see FIG. 5) as the reference image and searches for a match in the top image 98b (FIG. 5). Using Eq. (8) to construct an intensity segment for the reference image gives:

$$S_{0i}=I_0[F_{0i}, F_{0i}+1, \ldots, F_{0(i+1)}-1, F_{0(i+1)}]; i=0, \ldots N_0-1 \quad \text{Eq. (9)}$$

where $N_0$ is the number of feature points on a specific column in the bottom image. Notice that $S_{0i}$ starts at a feature point $F_{0i}$; ends at a subsequent feature point $F_{0(i+1)}$. Every $S_{0i}$ in the bottom image seeks a best match in the top image. The candidate segment in the top image is constructed differently as $$S_{1j}=I_1[F_{1j}, F_{1j}+1, \ldots, F_{1j}+L_{0i}-1, F_{1j}+L_{0i}]; j=0, \ldots, N_1 \quad \text{Eq.(10)}$$

where $L_{0i}=F_{0(i+1)}-F_{0i}$, and $N_1$ is the number of feature points on a specific column in the top image. Notice that $S_{1j}$ starts at a feature point $F_{1j}$; ends at a pixel that is not necessarily the subsequent feature point $F_{1(j+1)}$. With this construction, $S_{1j}$ has the same length as $S_{0i}$, which is required by the following score computing process. It should be pointed out that there are other methods to construct two equal length segments, such as decimation for the longer one to take out some elements, or interpolation for the shorter one to add some elements.

Figure 7:
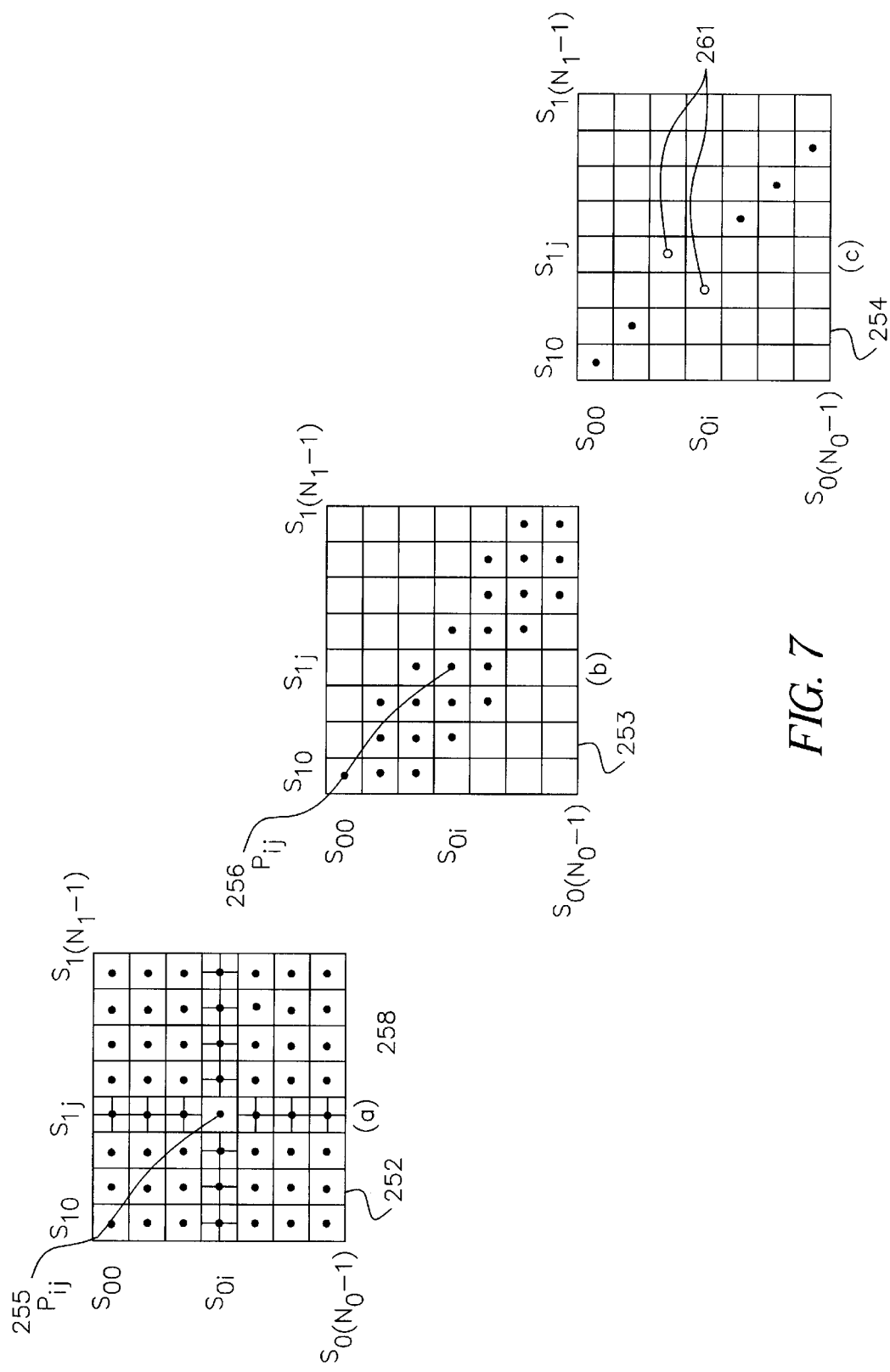
FIGS. 7a, 7b, and 7c are score-matrices in a corresponding points search process for two images.
Figure 13:
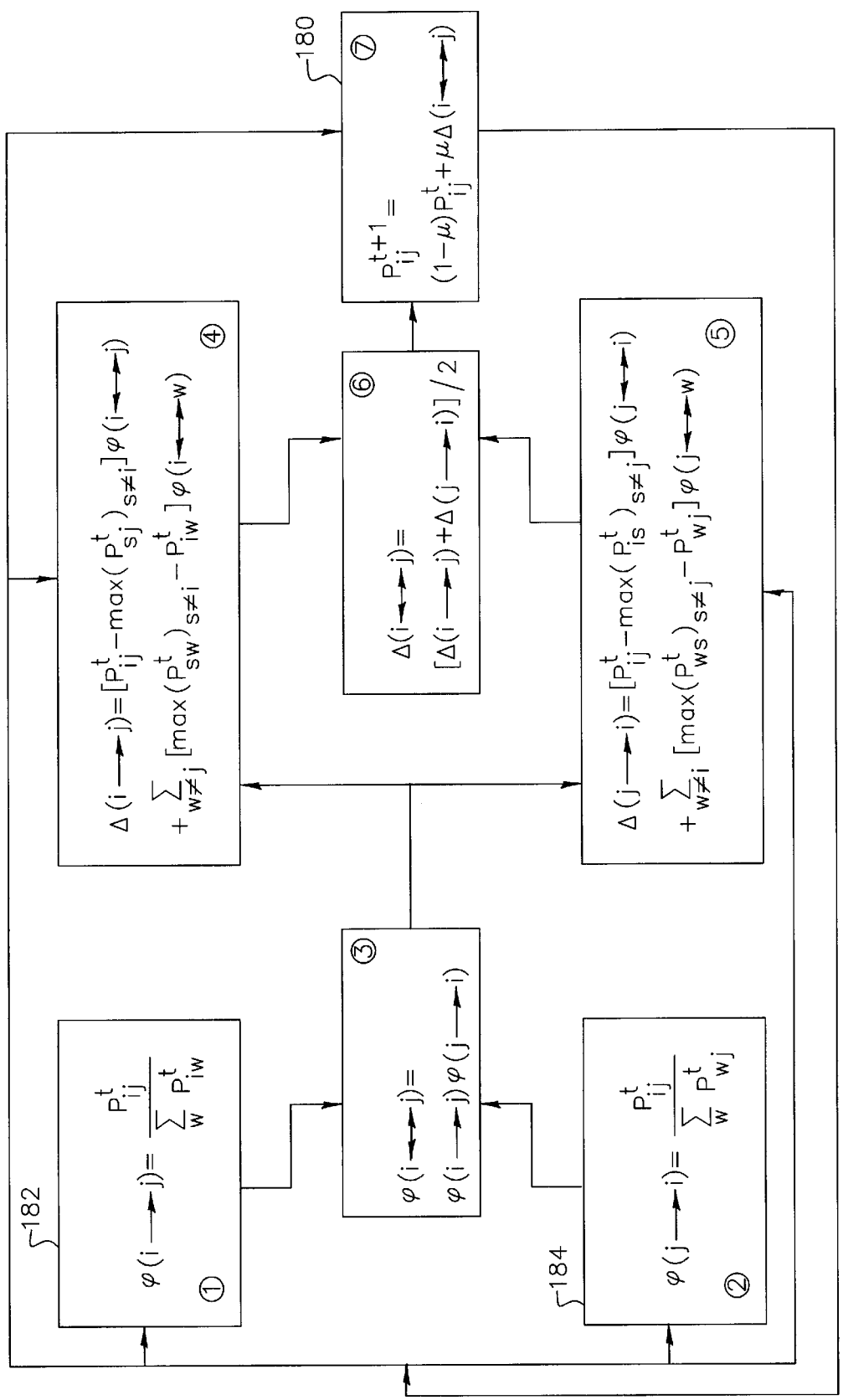
FIG. 13 is an example of a bipartite match network.

It can be seen that there are maximum $N_0 \times N_1$ pairs of feature point guided segments to compare in order to get at most $\min(N_0, N_1)$ pairs of best matches. This can be represented by an $N_0 \times N_1$ matrix 252 as shown in FIG. 7(a), which represents pairs of intensity values indicative of potential correspondence between features in the two intensity images. Every pair of $S_{0i}$ and $S_{1j}$ is associated with a match score 255 as the matrix element (i.e., a match score value $P_{ij}$ for each matrix location as represented by a filled in circle in the matrix 252). The score is computed as $$P_{ij}=1/SSD(S_{0i}, S_{1j}) \quad \text{Eq. (11)}$$

where SSD stands for Sum of Squared Difference, and $$SSD(S_{0i}, S_{1j}) = \frac{[S_{0i}-S_{1j}] \cdot [S_{0i}-S_{1j}]}{\sqrt{(S_{0i} \cdot S_{0i})(S_{1j} \cdot S_{1j})}} \quad \text{Eq. (12)}$$

where "•" signifies an inner product operation. For each $S_{0i}$ the matched pair $S_{0i} \leftrightarrow S_{1j}$, where ↔ indicates a match, is the one that maximizes the score $P_{ij}$. Conflict occurs when more than one $S_{0i}$ claims the same $S_{ij}$ as a match mate. To achieve at-most-one-to-one match, the $P_{ij}$s are fed into a bipartite match network (see FIG. 13) as initial values $P_{ij}^0$. The match goes through an iteration process (score updating block 180) using the interaction information contained in the network. In the score updating block 180, $\mu$ is a parameter within the range [0,1], $\Delta(i \leftrightarrow j)$ denotes the support function for the true match of segments $S_{0i}$ and $S_{ij}$. (See also Chou, S. L. and Tsai, W. H., "Line segment matching for 3D computer vision using a new iteration scheme," *Machine Vision and*

*Applications*, No. 6, pp 191–205, 1993.) To adjust the score of a pair, say, $(S_{0i}, S_{1j})$, the match status of all the segments paired with either $S_{0i}$ or $S_{1j}$ (see FIG. 7(a)), those pairs indicated with a crossmark 258) are checked. If many segments take $S_{0i}$ or $S_{1j}$ as their best matches, the interference is strong and the score $P_{ij}{}^t$ is decreased; otherwise, $P_{ij}{}^t$ is increased. By iterations, the process converges to a final result $P_{ij}{}^T$. The termination time T can be determined either by a fixed iteration value or by checking if the score change is less than a preset.

In general, there are $N_0 \times N_1$ pairs to compare. But in reality, some pairs are not feasible. For instance, a segment at the top of the bottom image has no chance to pair with a segment at the bottom of the top image. So a disparity limit constraint is applied to the initial score computation as $$p_{ij}^0 = \begin{cases} 0 & \text{if } |F_{0i} - F_{1j}| > fb/z_{\min} \\ 1/SSD(S_{0i}, S_{1j}) & \text{otherwise} \end{cases} \quad \text{Eq. (13)}$$

where $z_{min}$ is the distance of the nearest scene point to the camera. FIG. 7(b) shows the initial score matrix 253 after applying the disparity limit constraint. The bipartite match network takes scores in FIG. 7(b) as the initial values in blocks 182 and 184 (FIG. 13), and the iteration process ignores those pairs having zero score value. This modification not only reduces the computational complexity, but also reduces the false positive rate.

There is another constraint introduced in the match process: the ordering constraint. It simply states:

$$\text{if } S_{ki} \leftrightarrow S_{k'j}|_{k \neq k'} \text{ then } S_{k(i-r)} \updownarrow S_{k'(j+r)}|_{k \neq k'} \quad \text{Eq. (14)}$$

where $\updownarrow$ reads 'not match' and i'≧1; j'≧1; k=0,1; k'=0,1. This can be deduced from Eq. (7). As shown in FIG. 7(c), in the final match result the two matched pairs marked as circles 261 should be taken out because they violate what stated in Eq. (14).

Figure 8:
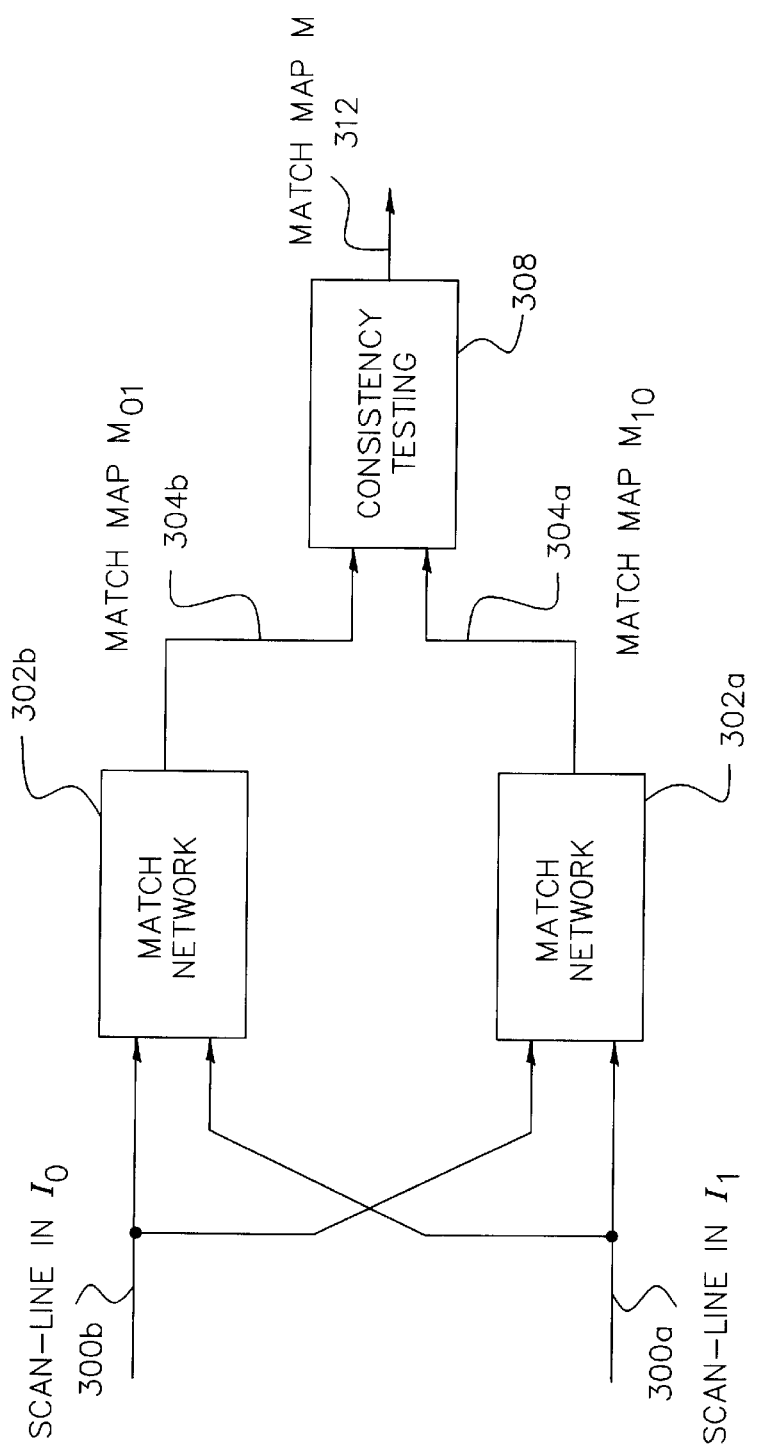
FIG. 8 is a more detailed flow chart for the first step in FIG. 6.

However, mismatches still exist in the above discussed match process. To further reduce the false positives caused by mismatches, the match process uses two match networks 302a and 302b followed by a consistency test block 308 as shown in FIG. 8. Each match network takes one image as the reference and the other image as the candidate, and produces a $N_0 \times N_1$ match map 304b or 304a (i.e., either match map $M_{01}$ or match map $M_{10}$), an element of which will be set to 1 if there is a match claimed, otherwise the element is set to 0. The final match map 312 (M) is the result of an AND, ∩, operation being applied to the two individual match maps which are usually not identical. That is, $$M = M_{01} \cap M_{10} \quad \text{Eq. (15)}$$

The above match process is applied to one scan-line at a time. It is needed to define a full size depth image D that has the same dimension, M×N, as the intensity image:

$$D = [d_0, \ldots d_n, \ldots, d_{N-1}] \quad \text{Eq. (16)}$$

where $d_n$ is an M×1 column vector:

$$d_n = [d_{0n}, \ldots d_{mn}, \ldots d_{(M-1)n}]' \quad \text{Eq. (17)}$$

and $d_{mn} = F_{0i} - F_{1j}$, if $\phi_{mn}{}^0 = 1$ and if the match map M for this particular column n confirms that the feature point at the location (m, n) in the bottom image indeed has a match represented by $S_{0i} \leftrightarrow S_{1j}$. Otherwise, $d_{mn} = 0$, if $\phi_{mn}{}^0 = 1$ and if the match map M for this particular column n confirms that the feature point at the location (m, n) in the bottom image does not have a match. The values $d_{mn} = F_{0i} - F_{1j}$ therefore correspond to the aforementioned found disparities $d_{v_p}$, and as such form the basis for determining the distances $z_p = fb/d_{v_p}$, where b is the baseline 82 and f is a focal length 81 of the imaging system. For later use, denote the collection of the elements of D that are assigned with depth values by D' and the collection of elements with no depth values by D".

3. Color Property Assisted Depth Propagation

The depth map or depth image D has validated (through consistency testing) depth values $d_{mn}$ at pixels that are feature points. The obtained depth image has very low spatial density, that is, a large amount of pixels including those pixels within the feature point set have not been assigned with depth values. In many cases a denser or a more completely defined depth field is desirable. A common practice in the machine vision community to tackle this problem is to fit surface patches to depth measurements that are available. A simple surface fitting approach most likely will blur the depth boundaries (depth discontinuity) that are represented by depth values at those feature points. In accordance with the current invention, color properties of the original intensity image are incorporated in depth surface fitting to preserve clear depth boundaries. The process splits into two steps: propagation and interpolation. The propagation step will be explained below. The interpolation step will be discussed along with the depth mask formation procedure.

In accordance with the current invention, two color property maps are used, an M×N hue map H and an M×N purity map P for the original color (R,G,B) image. An element $h_{mn}$ of the hue map H is computed using the formula:

$$r = R/RGB; \quad g = G/RGB; \quad b = B/RGB;$$
$$x = \frac{2r - g - b}{\sqrt{6}\sqrt{(r-1/3)^2 + (g-1/3)^2 + (b-1/3)^2}}$$
$$h_{mn} = \begin{cases} \operatorname{acos}(x) & \text{if } g < b \\ 2\pi - \operatorname{acos}(x) & \text{if } g \geq b \end{cases} \quad \text{Eq. (18)}$$

An element $p_{mn}$ of the purity map is computed as:

$$p_{mn} = r + g + b - 3\min(r, g, b) \quad \text{Eq. (19)}$$

Define an M×N unmatched feature point map, Λ, with its element $\lambda_{mn}$:

$$\lambda_{mn} = \begin{cases} 1 & \text{if } \phi_{mn}^0 = 1 \text{ and } d_{mn} \in D'' \\ 0 & \text{otherwise} \end{cases} \quad \text{Eq. (20)}$$

where $\phi_{mn}{}^0$ is defined in Eq. (5).

Figure 9:
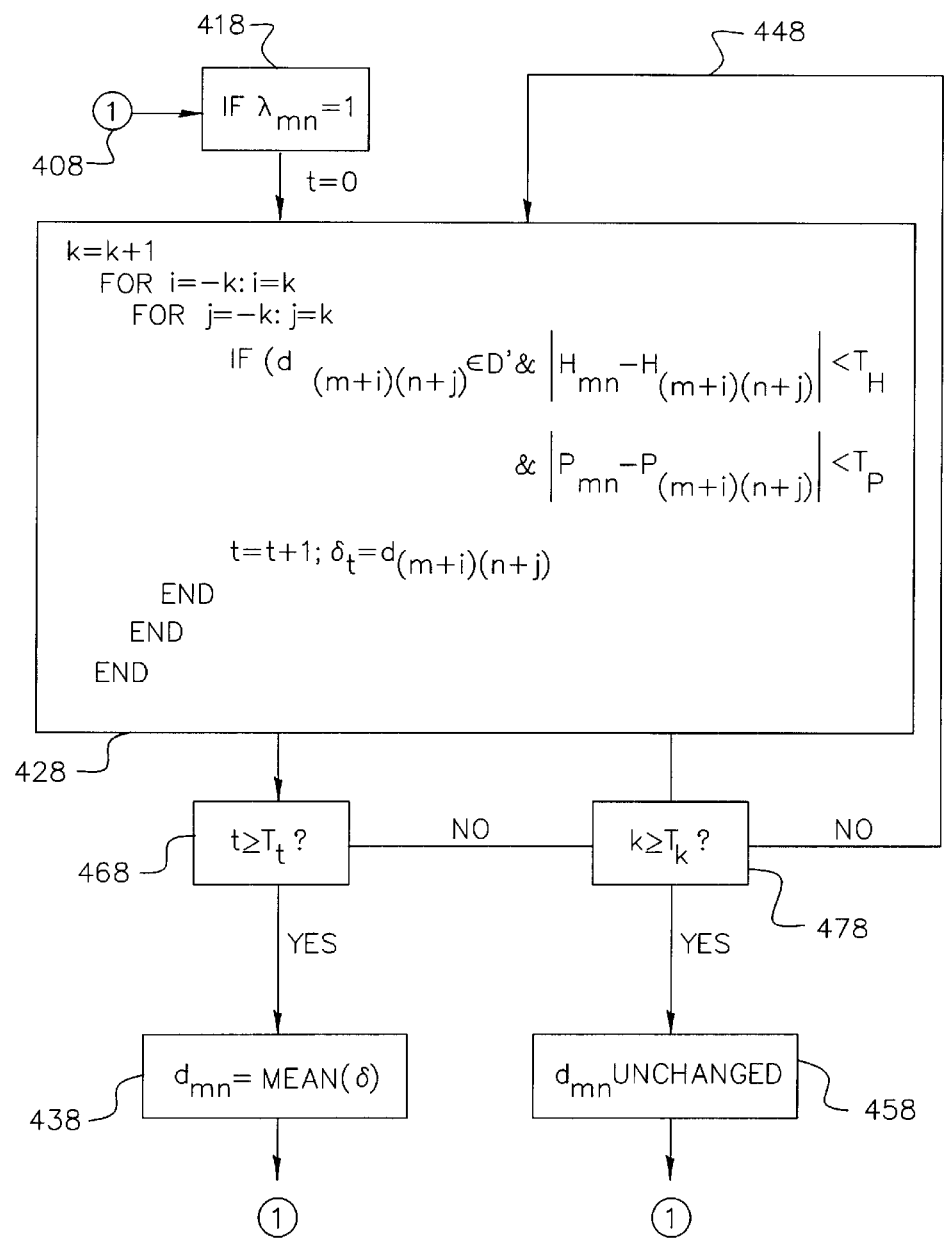
FIG. 9 is a more detailed flow chart for the second step in FIG. 6.

In accordance with the flow chart in FIG. 9, the propagation process starts at an input terminal 408. A (2k+1)×(2k+1) window is centered at $\lambda_{mn} = 1$ (as shown in blocks 418 and 428). k is initialized as zero and adjustable from 1 to a predefined integer $T_K$ (see blocks 428 and 478). Search within the window for the elements $d_{(m+i)(n+j)} \in D'|_{-k \leq i,j \leq k; i,j \neq 0}$ that have similar color property as $d_{mn}$ (block 428). The color property similarity measure is a simple distance testing in the color space by checking if the difference between $d_{mn} \in D''$ and $d_{(m+i)(n+j)} \in D'$ is less than a predetermined threshold $T_H$ in hue domain and $T_p$ in purity domain (see block 428). Define a vector δ that collects minimum $T_t$ number of elements, $d_{(m+i)(n+j)}$, that satisfy the criteria (see blocks 468 and 428). If there is not enough satisfied elements within the window that has a size up to $2T_K + 1$, then $d_{mn}$ is unchanged (blocks 478 and 458); otherwise, $d_{mn} = \operatorname{mean}(δ)$ (see block 428, where $δ_t = d_{(m+i)(n+j)}$, and block 438).

4. Foreground Mask Generation

Figure 10:
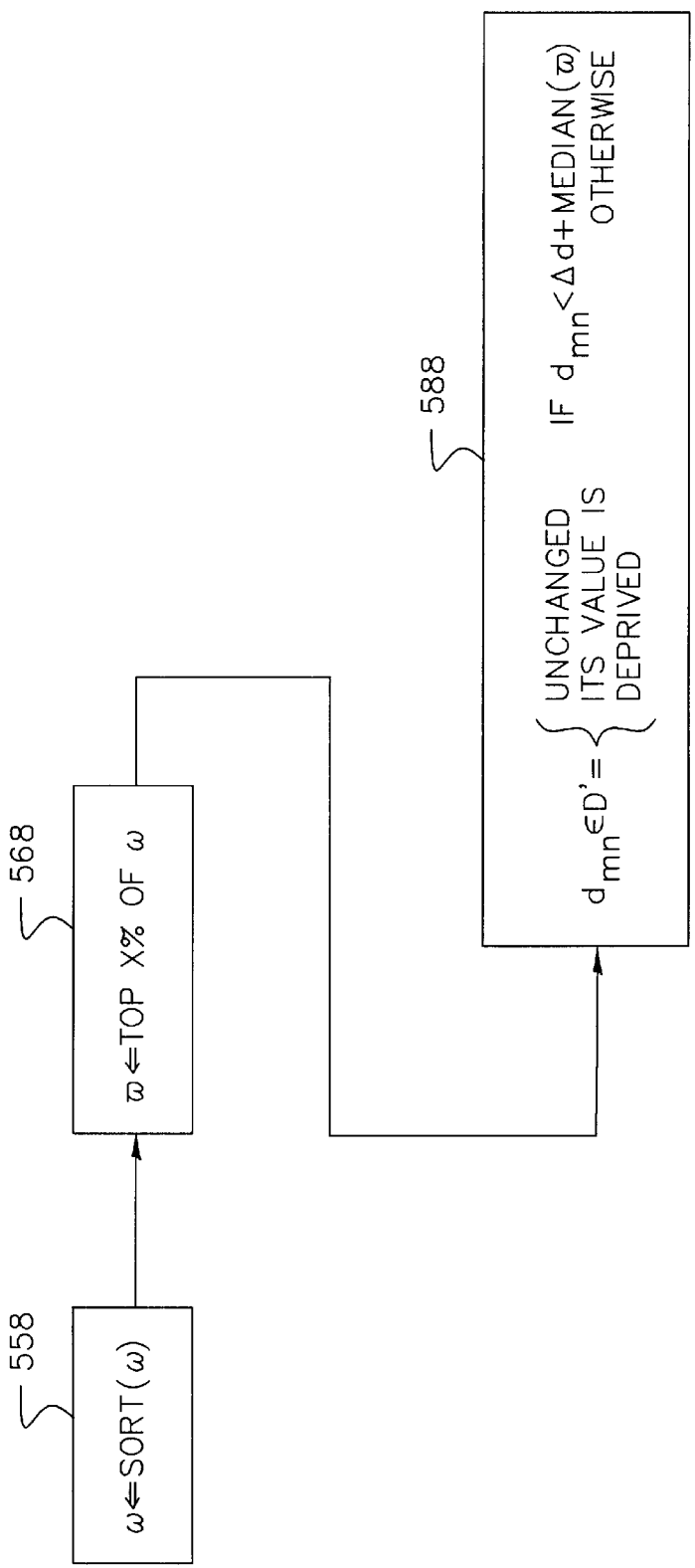
FIG. 10 is a more detailed flow chart for the third step in FIG. 6.

The foreground differentiation process is summarized in FIG. 10. The generated depth map D provides sufficient spatial information to locate the foreground objects three dimensionally. The foreground objects can be readily differentiated based on the depth values of the depth map D. In accordance with FIG. 10, let ω be a vector containing the elements $d_{mn} \in D'$ that are assigned with depth values. Sort the vector ω in a descending order (or ascending order) and then collect the top (or bottom) x% (between 10% to 30%) of its sorted elements (see blocks 558 and 568). Denote the collected elements by $\bar{\omega}$. Examine the elements $d_{mn} \in D'$. Change $d_{mn} \in D'$ to $d_{mn} \in D''$ if its value is greater (if ω is in a descending order) than $\Delta d + \text{median}(\bar{\omega})$ (block 588), where $\Delta d$ is an estimated thickness value of the foreground.

The result of the above process is a reduced set of D' that contains essentially the foreground elements. In some cases there are uninterested objects that also belong to the foreground of the scene. These uninterested objects have to be removed before the formation of the foreground depth mask. Generally, there is a distance between the foreground objects of interest and that of no interest. In accordance with the present invention, the following steps are carried out to correct this problem. Compute the histogram of the elements $d_{mn} \in D'$ column-wise after the foreground differentiation process is done. Find the valley(s) of the envelope of the computed histogram. Use the detected valley as a spatial indicator to delete unwanted foreground points. The result is a further reduced set of D' that contains the foreground points of interest.

Figure 11:
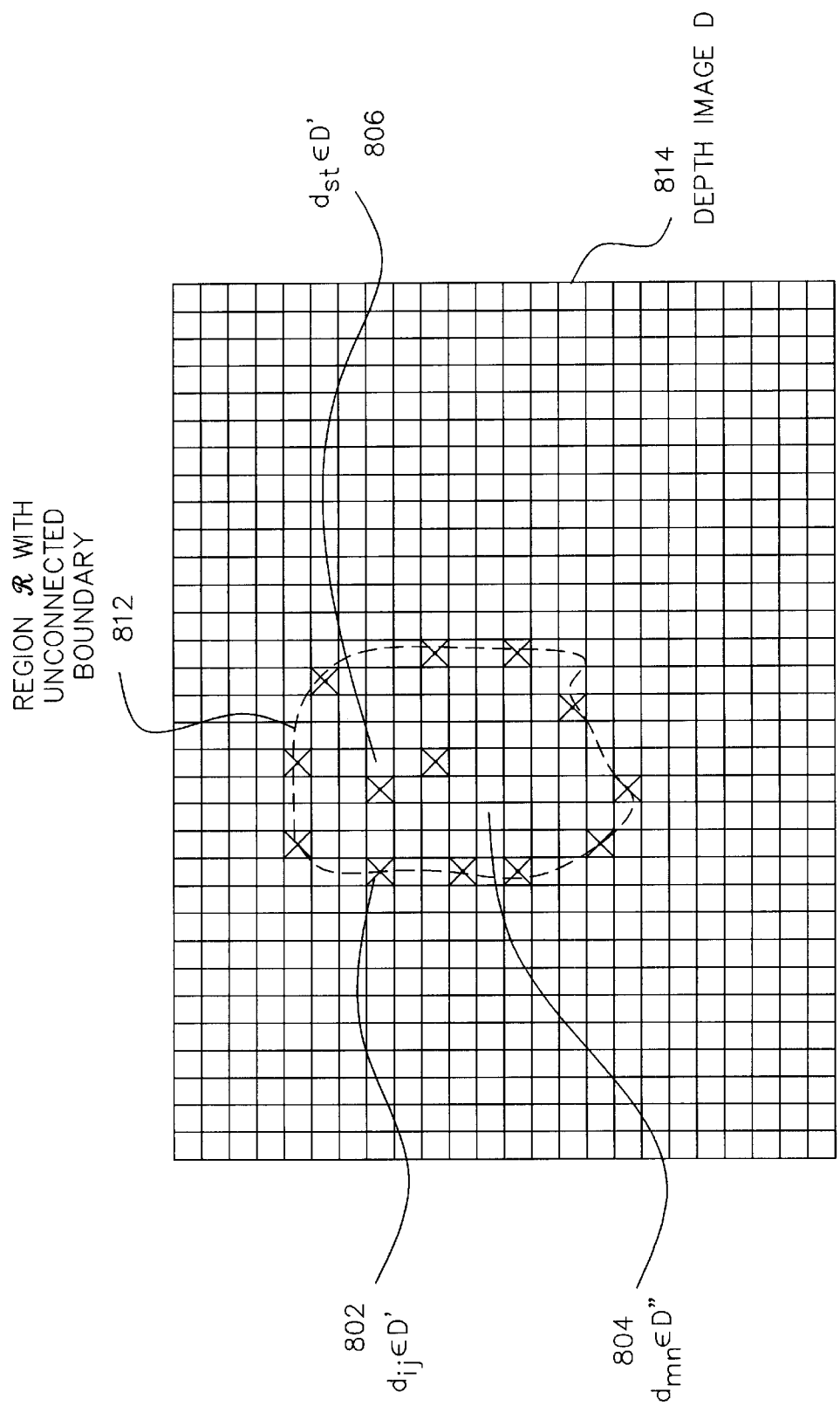
FIG. 11 is a diagrammatic illustration depicting a region that is to be interpolated to form the foreground depth mask.

In accordance with the invention, the color property assisted depth interpolation is carried out to form a foreground depth mask. Denote $\mathfrak{R}$ as the region 812 where the remaining elements of D' reside within the map 814 (D), (see FIG. 11). This region 812 ($\mathfrak{R}$), has unconnected boundary points 802 ($d_{ij} \in D'$) as well as interior points 806 ($d_{st} \in D'$) that are all edge points of the foreground object of interest. This region $\mathfrak{R}$ also contains elements 804 ($d_{mn} \in D''$). The goal is to estimate depth values for those points 804 ($d_{mn} \in D''$) in the region 812 ($\mathfrak{R}$) based on the points 802 ($d_{ij} \in D'$) or 806 ($d_{st} \in D'$) through a color property assisted eight-nearest-neighbor LMS (least median squared) interpolation process. The procedure is quite similar to that shown in FIG. 9 but with a different search strategy and estimation function. For every element 804 ($d_{mn} \in D''$) inside the region 812 ($\mathfrak{R}$), search and collect its eight-nearest-neighbor elements 802 ($d_{ij} \in D'$) or 806 ($d_{st} \in D'$) with similar color properties. If the number of collected elements, N, is less than M (M is a user selected number, $3 \leq M \leq 5$), increase the eight-nearest-neighbor search distance until the search reaches a predefined distance limit. The maximum value for N is 8. If $M \leq N \leq 8$, choose M elements out of N at a time. So, there are C number of choices, where $$C = \frac{N!}{M!(N-M)!}.$$

Use each of the C sets of M elements to compute a linear model, $\Psi$, with parameter vector $\beta_c$ which best fits a surface patch covering the M elements. There are C number of $\beta_c$ vectors, $1 \leq c \leq C$. For each of the $\beta_c$ vectors, find the weighted median of the square of the residual of the N elements (see Eq. (21)). The weight is a reciprocal of the distance from elements 804 ($d_{mn}$) to 802 ($d_{ij}$) or 806 ($d_{st}$).

The final choice will be the vector $\beta_c$ that minimizes the weighted median of the square of the residuals:

$$\beta_{min} = \min_{\beta_c} \left\{ \underset{q,p}{\text{weighted median}} \left[ \underbrace{(d_{qp} \in D' - \Psi(q, p; \beta_c))^2}_{residual} \right] \right\} \quad \text{Eq. (21)}$$

where $\Psi(q,p,\beta_c) = \beta_{c1} + q\beta_{c2} + p\beta_{c3} + qp\beta_{c4}$, and $d_{qp}$ is one of the N elements including $d_{ij}$ and $d_{st}$. Use the selected parameter vector $\beta_{min}$ to estimate the depth value for element 804 ($d_{mn} \in D''$). Normally, two to three iterations of this process will fill the region 812 ($\mathfrak{R}$) completely. This filled region becomes the foreground depth mask. This mask can be applied to the original intensity image to extract the foreground object of interest and to position the extracted object in a 3D graphics, or in a 2D picture.

In a typical implementation of the invention, the computer program product bearing the inventive algorithms would either be provided directly to a user, who would use it in connection with the processing of images, or it would be used in a shared setting, where a customer would bring pictures and/or negatives to the shared computer for scanning and enhancement, or would directly enter digital scan data into the shared computer. Alternatively, the algorithms could be made available in a web-based version of the product, where either the algorithms are downloaded via the network connection to the user or the algorithm computation is done on a server in a web-based environment.

The invention has been described with reference to a preferred embodiment. However, it will be appreciated that variations and modifications can be effected by a person of ordinary skill in the art without departing from the scope of the invention. For instance, while the key intensity parameter has been described as an intensity segment, it should be understood that other intensity representations may be associated with features, for example, mean or average intensities, intensity histograms, etc.

| PARTS LIST | |
|---|---|
| 10 | grey scale image |
| 11a, 11b | cameras |
| 13a, 13b | images |
| 14a, 14b | person images |
| 15a, 15b | computer images |
| 17 | person |
| 16 | computer |
| 18 | foreground mask image |
| 19 | foreground depth mask |
| 20 | composited image |
| 21 | corresponding region |
| 31 | door scene |
| 34 | intermediate image |
| 35 | portion |
| 36 | door |
| 41 | composite image |
| 62 | face picture |
| 63 | person |
| 72a, 72b | points |
| 73a, 73b | 2D image coordinate system |
| 73 | 3D world coordinate system |
| 74a, 74b | nodal points |
| 75 | 3D point |
| 76 | depth information |
| 78 | XZ plane |
| 81 | focal length |
| 82 | baseline |
| 91 | vertical indices |
| 92a, 92b | feature points |

-continued

PARTS LIST

| | |
|---|---|
| 93a, 93b | intensity segments |
| 95 | vertical scan line |
| 98a | bottom image |
| 98b | top image |
| 110 | computer system |
| 112 | microprocessor |
| 114 | display |
| 116 | keyboard |
| 118 | mouse |
| 120 | selector |
| 122 | CD-ROM memory |
| 124 | compact disk |
| 126 | floppy disk |
| 127 | network connection |
| 128 | printer |
| 130 | PC card |
| 216 | feature points matching |
| 217 | disparity propagation |
| 218 | foreground mask formats |
| 252 | matrix |
| 253 | initial score matrix |
| 255 | notch score |
| 302a, 302b | match networks |
| 304a, 304b | match map |
| 308 | consistency test block |
| 312 | final match map |
| 408 | input terminal |
| 418 | block |
| 428 | block |
| 438 | block |
| 458 | block |
| 468 | block |
| 478 | block |
| 558 | block |
| 568 | block |
| 588 | block |
| 802 | boundary point |
| 804 | element |
| 806 | interior point |
| 812 | region |
| 814 | depth map |

What is claimed is:

1. A method for forming a depth image of a scene from at least two intensity images of the scene representing two separate displaced versions of the same scene, said method comprising the steps of:
  (a) generating intensity parameters corresponding to the intensity of line segments in each intensity image, said intensity parameters in one image corresponding to a line segment bounded by image feature points and pairing with intensity parameters in the other image corresponding to a line segment starting with one feature point and ending with a point that is not necessarily a feature point to form pairs of intensity parameters indicative of potential correspondence between features in the two intensity images;
  (b) eliminating one or more pairs of intensity parameters based on one or more constraints related to the feasibility of a valid match between the pairs of intensity parameters;
  (c) calculating a match score for each of the remaining pairs of intensity parameters;
  (d) processing the match scores of the remaining pairs of intensity parameters through a processing algorithm in order to find matched pairs of intensity parameters indicative of correspondence between the same features in the two intensity images; and
  (e) generating a depth map from the matched pairs of intensity parameters.

2. A method as claimed in claim 1 wherein the feature point is an edge.

3. A method as claimed in claim 1 in which the step (b) of eliminating one or more pairs of intensity parameters comprises use of a disparity limit constraint based on the image locations of the features related to a given pair of intensity parameters.

4. A method as claimed in claim 1 wherein the step (c) of calculating a match score is based on the sum of squared differences between paired intensity parameters.

5. A method as claimed in claim 1 wherein the step (d) of processing the match scores comprises using a bipartite match network.

6. A method as claimed in claim 5 wherein the step (d) of processing the match scores with a bipartite network comprises production of a match map by using one intensity image as the reference image and the other image as the candidate image.

7. A method as claimed in claim 6 wherein the step (d) of processing the match scores with a bipartite network comprises processing the match scores twice, with the reference and candidate images reversed, and then eliminating any pairs of intensity parameters that were not twice matched.

8. A method as claimed in claim 7 wherein the step (d) of processing the match scores with a bipartite network comprises processing the match scores through two networks followed by a consistency test for pairs of feature parameters were not matched in both networks.

9. A method as claimed in claim 1 wherein the step (d) of processing the match scores comprises eliminating false positive matches by using an ordering constraint.

10. A method as claimed in claim 1 wherein the step (e) of generating a depth image comprises generating a depth image from the location disparities between matched features corresponding to the matched pairs of intensity parameters.

11. A method as claimed in claim 1 wherein the step (e) of generating a depth image comprises propagating additional values in the depth image based on the color properties of the original intensity image.

12. A method as claimed in claim 11 wherein the color properties comprises at least one of the hue and color purity.

13. A method as claimed in claim 1 wherein the step (e) of generating a depth image comprises generating a foreground depth mask corresponding to foreground objects in the scene.

14. A method as claimed in claim 13 wherein the step (e) of generating a depth image comprises generating a foreground depth mask by using a color assisted interpolation to obtain additional depth values for the depth image.

15. A method as claimed in claim 1 wherein the steps (a)–(d) are applied to the intensity images one line at a time.

16. A method as claimed in claim 15 wherein the step (e) of generating a depth image is performed after all the lines in the two intensity images have been processed.

17. A computer program product for forming a depth image from at least two images of the scene representing two separate displaced versions of the same scene comprising: a computer readable storage medium having a computer program stored thereon for performing the steps of:
  (a) generating intensity parameters corresponding to the intensity of line segments in each intensity image, said intensity parameters in one image corresponding to a line segment bounded by image feature points and pairing with intensity parameters in the other image corresponding to a line segment starting with one feature point and ending with a point that is not necessarily a feature point to form pairs of intensity parameters indicative of potential correspondence between features in the two intensity images;

(b) eliminating one or more pairs of intensity parameters based on one or more constraints related to the feasibility of a valid match between the pairs of intensity parameters;

(c) calculating a match score for each of the remaining pairs of intensity parameters;

(d) processing the match scores of the remaining pairs of intensity parameters through a processing algorithm in order to find matched pairs of intensity parameters indicative of correspondence between the same features in the two intensity images; and (e) generating a depth map from the matched pairs of intensity parameters.

18. A computer program product as claimed in claim 17 wherein the feature point is an edge.

19. A computer program product as claimed in claim 17 in which the step (b) of eliminating one or more pairs of intensity parameters comprises use of a disparity limit constraint based on the image locations of the features related to a given pair of intensity parameters.

20. A computer program product as claimed in claim 17 wherein the step (c) of calculating a match score is based on the sum of squared differences between paired intensity parameters.

21. A computer program product as claimed in claim 17 wherein the step (d) of processing the match scores comprises using a bipartite match network.

22. A computer program product as claimed in claim 21 wherein the step (d) of processing the match scores with a bipartite network comprises production of a match map by using one intensity image as the reference image and the other image as the candidate image.

23. A computer program product as claimed in claim 22 wherein the step (d) of processing the match scores with a bipartite network comprises processing the match scores twice, with the reference and candidate images reversed, and then eliminating any pairs of intensity parameters that were not twice matched.

24. A computer program product as claimed in claim 23 wherein the step (d) of processing the match scores with a bipartite network comprises processing the match scores through two networks followed by a consistency test for pairs of feature parameters that were not matched in both networks.

25. A computer program product as claimed in claim 17 wherein the step (d) of processing the match scores comprises eliminating false positive matches by using an ordering constraint.

26. A computer program product as claimed in claim 17 wherein the step (e) of generating a depth image comprises generating a depth image from the location disparities between matched features corresponding to the matched pairs of intensity parameters.

27. A computer program product as claimed in claim 17 wherein the step (e) of generating a depth image comprises propagating additional values in the depth image based on the color properties of the original intensity image.

28. A computer program product as claimed in claim 27 wherein the color properties comprises at least one of the hue and color purity.

29. A computer program product as claimed in claim 17 wherein the step (e) of generating a depth image comprises generating a foreground depth mask corresponding to foreground objects in the scene.

30. A computer program product as claimed in claim 29 wherein the step (e) of generating a depth image comprises generating a foreground depth mask by using a color assisted interpolation to obtain additional depth values for the depth image.

31. A computer program product as claimed in claim 17 wherein the steps (a)–(d) are applied to the intensity images one line at a time.

32. A computer program product as claimed in claim 31 wherein the step (e) of generating a depth image is performed after all the lines in the two intensity images have been processed.

33. A method for forming a depth image of a scene from at least two intensity images of the scene, said method comprising the steps of:

(a) generating intensity parameters corresponding to image features in each intensity image, said intensity parameters in one image pairing with intensity parameters in the other image to form pairs of intensity parameters indicative of potential correspondence between features in the two intensity images;

(b) eliminating one or more pairs of intensity parameters based on one or more constraints related to the feasibility of a valid match between the pairs of intensity parameters;

(c) calculating a match score for each of the remaining pairs of intensity parameters;

(d) processing the match scores of the remaining pairs of intensity parameters using a bipartite match network in order to find matched pairs of intensity parameters indicative of correspondence between the same features in the two intensity images; and (e) generating a depth map from the matched pairs of intensity parameters.

34. A method as claimed in claim 33 wherein the step (d) of processing the match scores with a bipartite network comprises production of a match map by using one intensity image as the reference image and the other image as the candidate image.

35. A method as claimed in claim 34 wherein the step (d) of processing the match scores with a bipartite network comprises processing the match scores twice, with the reference and candidate images reversed, and then eliminating any pairs of intensity parameters that were not twice matched.

36. A method as claimed in claim 35 wherein the step (d) of processing the match scores with a bipartite network comprises processing the match scores through two networks followed by a consistency test for pairs of feature parameters were not matched in both networks.

37. A computer program product for forming a depth image from at least two images of the scene comprising: a computer readable storage medium having a computer program stored thereon for performing the steps of:

(a) generating intensity parameters corresponding to image features in each intensity image, said intensity parameters in one image pairing with intensity parameters in the other image to form pairs of intensity parameters indicative of potential correspondence between features in the two intensity images;

(b) eliminating one or more pairs of intensity parameters based on one or more constraints related to the feasibility of a valid match between the pairs of intensity parameters;

(c) calculating a match score for each of the remaining pairs of intensity parameters;

(d) processing the match scores of the remaining pairs of intensity parameters using a bipartite network in order to find matched pairs of intensity parameters indicative of correspondence between the same features in the two intensity images; and (e) generating a depth map from the matched pairs of intensity parameters.

38. A computer program product as claimed in claim 37 wherein the step (d) of processing the match scores with a bipartite network comprises production of a match map by using one intensity image as the reference image and the other image as the candidate image.

39. A computer program product as claimed in claim 38 wherein the step (d) of processing the match scores with a bipartite network comprises processing the match scores twice, with the reference and candidate images reversed, and then eliminating any pairs of intensity parameters that were not twice matched.

40. A computer program product as claimed in claim 39 wherein the step (d) of processing the match scores with a bipartite network comprises processing the match scores through two networks followed by a consistency test for pairs of feature parameters that were not matched in both networks.

* * * * *